3,403,807
Patented Oct. 1, 1968

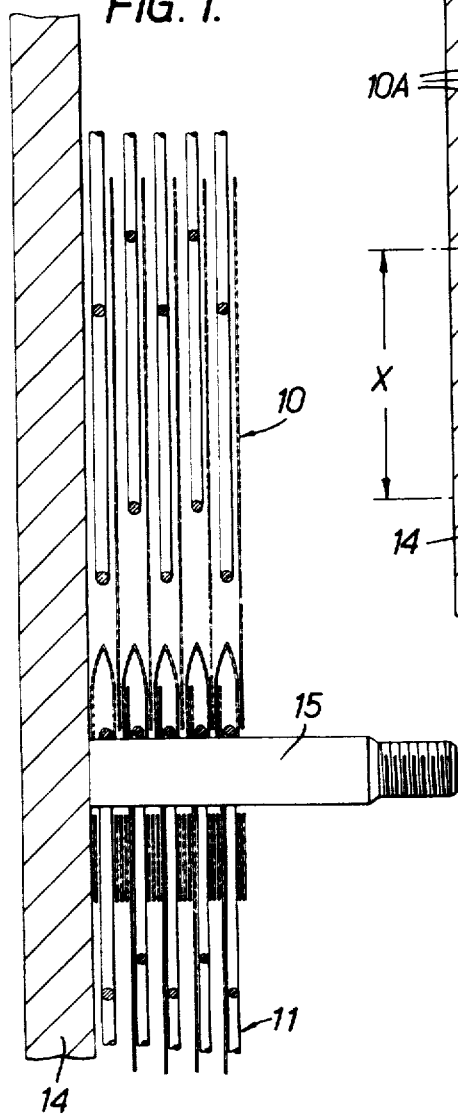
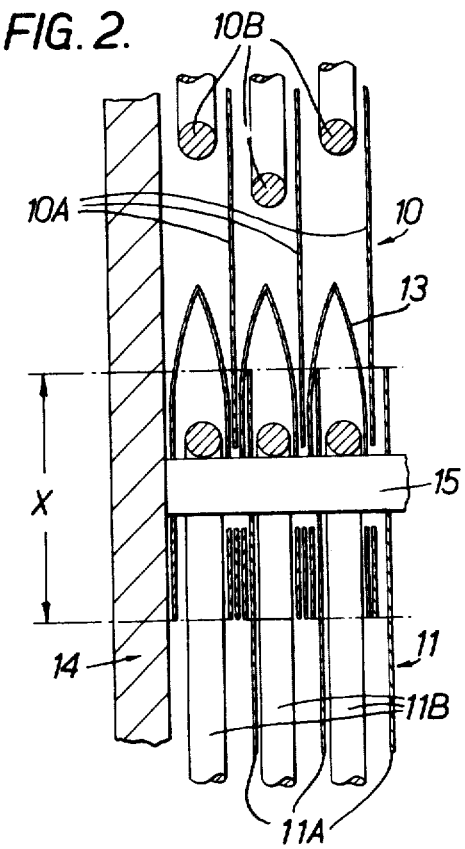

3,403,807
THERMAL INSULATION
John Hawgood and Edward Armstrong, Durham, England, assignors to Darchem Engineering Limited, Durham, England, a British company
Filed May 6, 1965, Ser. No. 453,689
Claims priority, application Great Britain, May 8, 1964, 19,243/64
3 Claims. (Cl. 220—9)

ABSTRACT OF THE DISCLOSURE

A method for thermally insulating the walls of large vessels such as nuclear reactors by securing a number of separate packs of spaced-sheets on the wall of the vessel in such a way that the sheets of the adjacent packs overlap in order to avoid abutting contact between one pack of sheets and the next pack. A sealing means is disposed within that part of the insulation where one pack overlaps another to minimize convection therebetween. The sealing means may be provided by separate capping means inserted between the sheets, or by angling the sheets of one pack across the space and then extending the sheets so angled into the other pack.

---

Figure 3:
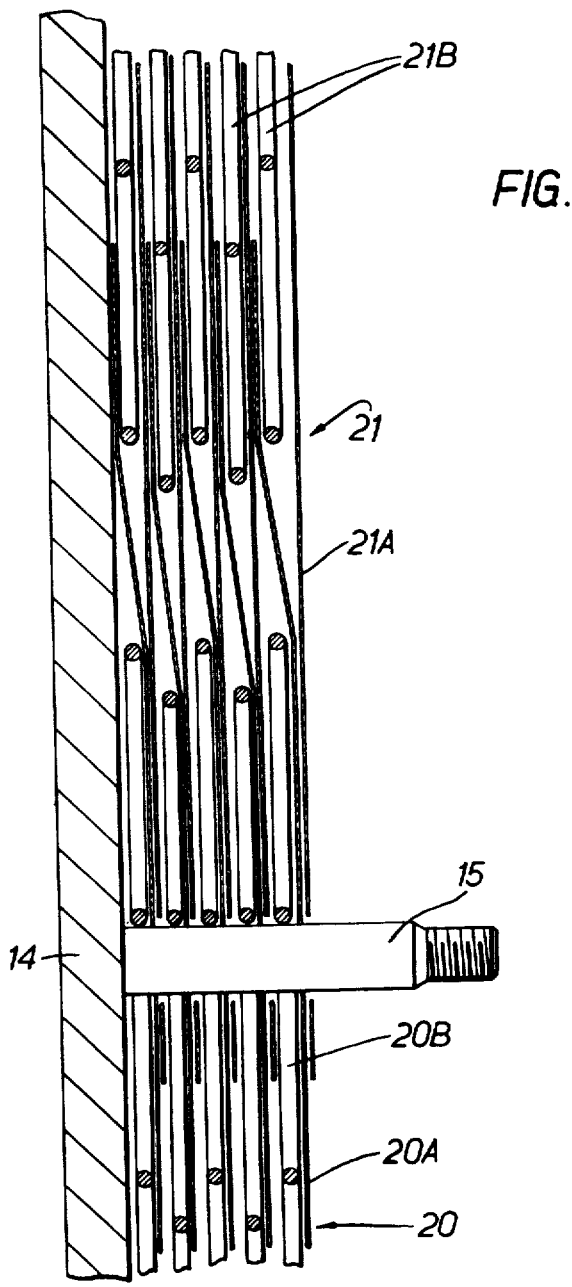

This invention relates to thermal insulation in which gases and/or liquids may be used as heat transfer media. Such insulation may be used for the internal insulation of pressure vessels containing gas, or liquid cooled nuclear reactors and throughout this specification the term "fluid" is used to included liquid and gaseous insulating media.

Packs of insulation comprising metal sheets separated by spacing members have been proposed and, where these packs are used for nuclear reactor pressure vessel insulation the sheets and spacers are preferably made from stainless steel. Packs of spaced metal sheets will be referred to herein simply as "packs." The insulation fluid is contained in the spaces formed between adjacent sheets in a pack and the insulation capacity of the fluid is dependent, among other factors, on the degree of movement of the fluid in the spaces caused by convection and it is an object of this invention to provide a method of reducing the convention effect.

According to a first aspect of this invention there is provided a method of reducing the convection effect of a fluid in a space formed between adjacent sheets in a pack wherein a sealing strip is located so as to substantially close the space between the adjacent sheets and thereby reduce the volume of the space in which convection can occur. Preferably the sealing strip has a V or U cross-section and the strips are disposed so that the V or U is inverted with respect to the direction in which ascending hot gas travels in a pack in the vertical or other non-horizontal orientation.

Where it is required to use packs for insulating a nuclear reactor or other pressure vessel the packs, which may be of rectangular shape, are secured to the pressure vessel so that the spaces between adjacent sheets in one pack are in substantial alignment with corresponding spaces in an adjacent pack. In these circumstances convection effects tend to create considerable movement of fluid in the aligned spaces throughout the insulation with an attendant reduction in the capacity of the fluid to act as a thermal insulant. According to a feature of the first aspect of this invention the sealing strips are disposed so as to substantially seal a space in one pack from an aligned space in an adjacent pack. The V or U sealing strips, in effect, form a series of caps for the spaces in a pack. As referred to earlier the sheets of a pack are separated by spacing members and we have found that an effective seal is obtained if the sides of the V or U sectioned strip are clamped between a spacing member and an appropriate sheet.

The invention also includes a pack having sealing strips as described in relation to the first aspect of this invention.

According to a second aspect of this invention there is provided a method of substantially sealing a space between adjacent sheets in on pack from an aligned space in and between adjacent sheets in a neighbouring pack wherein the sheets in one pack are interleaved with the sheets of the neighbouring pack in such a manner that the sheets of one pack extend across the aligned spaces of the neighbouring pack to form a seal. Preferably the interleaved parts of the sheets of the first mentioned pack are clamped between a spacing member and an appropriate sheet of the neighbouring pack.

Alternatively, if desired, corresponding sheets in two adjacent packs may be disposed to overlap and sealing between aligned spaces afforded by separate sealing strips. In this instance the sealing strips may have a cross-section resembling an elongated S with the edges of the strip clamped between a spacing member and an appropriate sheet so that the strip extends across the aligned space to effect a substantial seal.

The invention also includes two or more packs sealed in accordance with this second aspect of this invention.

The spacing members may be of various forms including wire in straight, zig-zag, or meshform. Expanded metal and other commercially available meshes may also be used. In order to reduce the weight of material in the spacing members and the attendant cost we have now found that satisfactory spacing can be achieved using a wire of smaller gauge than the spacing required if the wire is crimped, for example, we have obtained a 0.090 inch spacing using 0.050 inch gauge wire. Alternatively, crimped mesh or crimped expanded metal made from material of smaller gauge than the spacing required may also be used. The crimping may be carried out by passing the wire or mesh at 45° between corrugated rollers.

Packs of insulation as described above are generally secured to a nuclear reactor or other pressure vessel so that the sheets are for all practical purposes, parallel or concentric with the surfaces of the pressure vessel. We have now found that satisfactory insulation can be achieved if the sheets are inclined with respect to the surfaces of the pressure vessel to which they are secured thereby reducing the effective length of the spaces in which the fluid is contained.

Although the packs of insulation may be used for the insulation of all surfaces of nuclear reactor or other pressure vessels, problems arising from convection effects no longer apply when insulation of a pressure vessel base alone is considered since the heat source is above the base.

According to a further aspect of this invention there is provided a method of insulating the base of a pressure vessel wherein a number of relatively short tubular elements made from a thin and flexible metallic material, such as stainless steel, are arranged with their axes substantially perpendicular to the base of the pressure vessel and wherein the tubular elements are disposed between parallel metal plates. The tubular elements are, preferably, corrugated circumferentially to improve stability and load bearing capacity. One or more layers of such tubular elements may be used and the elements in one layer are preferably staggered with respect to the elements in an adjacent layer so as to afford rigidity to the insulation as a whole and decrease metallic conduction. Between each layer of elements thin sheets or foils of metallic material and a load spreading plate may be included. Usually nuclear reactor or other pressure vessels are constructed from metal plates which may be supported on a reinforced concrete platform. The plate structure may comprise a number of seam-welded plates and to accommodate upstanding weld beads the tubular elements are notched at 90° intervals around the periphery. The notches in the tubular elements are bridged by a much lighter gauge of metallic foil which has the capacity to deform to the contour of the weld beads. Moreover, a very thin gauge metallic foil skirt of not more than 1/8" in depth projects from the lower edge of each tubular element around the entire periphery of the element. Such skirts deform under load so that the fit of each tubular element to the surface on which it rests is "snug," thus forming a reasonable seal against gas leakage beneath the tubular elements. The tubular elements possess an advantage in that their flexibility permits the elements to be readily distorted to fit any required space.

Two methods of sealing aligned spaces between adjacent packs will now be described by way of example with reference to the accompanying drawings in which:

FIGURES 1 and 2 illustrate a method in accordance with the first aspect of the invention; and FIGURE 3 illustrates the second method in accordance with the invention.

In FIGURES 1 and 2 two packs designated 10 and 11 have their respective sheets 10A and 11A separated by mesh spacing members 10B and 11B. The sheets of each pack overlap by a distance X so that corresponding spaces in each pack are in alignment. The aligned spaces are sealed by inverted V sectioned sealing strips 13 and in FIGURE 2 the two sealing strips to the right of the figure have one leg disposed between a sheet 10A and a spacer 11B and the other leg between the adjacent sheet 10A and a sheet 11A. The packs including sealing strips are drilled for mounting on studs 15 welded to a pressure vessel casing 14. In FIGURES 1 and 2 it will be seen that the meshed spacing members in adjacent spaces are, in general, staggered except for those parts of the spacing members resting on the studs 15.

FIGURE 3 shows two packs 20 and 21 (similar to those of FIGURES 1 and 1A) in which sheets 20A of the pack 20 are interleaved with sheets 21A of the pack 21 so as to form a seal between aligned spaces in the two packs. Meshed spacing members 20B and 21B similar to those of FIGURES 1 and 2 are also used. In FIGURE 3, the sheets 20A are interleaved with sheets 21A and laid back across the aligned spaces so that the upper edges of the sheets 20A are clamped between an appropriate spacing member 21B and an appropriate sheet 21A. The packs are, as described with reference to FIGURES 1 and 2 supported on studs welded to the pressure vessel.

It will be seen from FIGURE 3 that the lay-back is moved one space nearer the pressure vessel casing 14 as the sheet progresses from bottom to top assuming a vertical or other non-horizontal orientation. However, if desired, lay-back in the opposite direction so that the sheets 20A move one space away from the pressure vessel casing 14 may also be used.

What we claim is:

1. In a pressure vessel having upwardly extending walls, means for insulating said walls, said insulating means comprising: a plurality of insulating packs, each of said packs consisting of a plurality of spaced apart fluid confining sheets; separator members cooperatively associated with said sheets so as to form aligned spaces extending from one pack to the next, the sheets of each of said packs being interleaved with the sheets of an adjacent pack so that said packs overlap one another; means for sealing said spaces, said sealing means being angled across said spaces between said adjacent sheets within that part of said insulating means at which adjacent packs overlap thereby reducing the volume of space in which convection can occur; said insulating means being applied to said vessel walls.

2. The insulating means in accord with claim 1, wherein said sealing means comprises a plurality of sealing strips located so as to substantially close the space between said adjacent sheets.

3. The insulating means in accord with claim 1, wherein said sealing means comprises a plurality of sealing strips having a substantially V cross-section located so as to substantially close the space between adjacent sheets.

References Cited

UNITED STATES PATENTS

| 2,215,532 | 9/1940 | Richardson | 165—135 X |
| 3,104,218 | 9/1963 | Speidel et al. | 165—162 X |
| 3,236,300 | 2/1966 | Chaue et al. | 156—136 |

FOREIGN PATENTS

| 668,860 | 8/1963 | Canada. |
| 701,713 | 1/1965 | France. |
| 1,379,117 | 10/1964 | France. |
| 891,353 | 3/1962 | Great Britain. |

ROBERT A. O'LEARY, *Primary Examiner.*

A. W. DAVIS, *Assistant Examiner.*